US008767526B1

(12) United States Patent
Jagannatharao et al.

(10) Patent No.: US 8,767,526 B1
(45) Date of Patent: Jul. 1, 2014

(54) SUPPLICANT FRAMEWORK TO HANDLE CLIENTLESS DEVICES ON A DOT1X PLATFORM

(75) Inventors: Manjunath Jagannatharao, San Jose, CA (US); Nipa Kumar, Santa Clara, CA (US); Sandip Shah, Milpitas, CA (US); Nagendra Krishna Sundaranathan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 679 days.

(21) Appl. No.: 12/978,987

(22) Filed: Dec. 27, 2010

(51) Int. Cl.
*H04L 29/06* (2006.01)

(52) U.S. Cl.
CPC .................................... *H04L 63/205* (2013.01)
USPC ..................... 370/216; 370/242; 726/3; 726/4

(58) Field of Classification Search
CPC ........ H04L 63/20; H04L 63/08; H04L 63/205
USPC ................................... 370/216, 242; 726/3, 4
See application file for complete search history.

(56) References Cited

U.S. PATENT DOCUMENTS

| 7,441,043 | B1 * | 10/2008 | Henry et al. .................. 709/238 |
| 7,576,883 | B2 | 8/2009 | Ragnet et al. |
| 7,590,075 | B2 | 9/2009 | Pirzada et al. |
| 7,624,431 | B2 | 11/2009 | Cox et al. |
| 7,636,338 | B1 | 12/2009 | Vu et al. |
| 7,653,200 | B2 | 1/2010 | Karmi et al. |
| 7,715,793 | B2 | 5/2010 | Fuccello et al. |
| 7,730,527 | B2 | 6/2010 | Charles et al. |
| 7,757,274 | B2 | 7/2010 | Lillie et al. |
| 8,528,071 | B1 * | 9/2013 | Kwan .............................. 726/14 |
| 2003/0163733 | A1 * | 8/2003 | Barriga-Caceres et al. .. 713/201 |
| 2005/0273849 | A1 * | 12/2005 | Araujo et al. ................... 726/12 |

OTHER PUBLICATIONS

Cisco, "Flexible Authentication Order, Priority, and Failed Authentication", 2009. http://www.cisco.com/en/US/prod/collateral/iosswrel/ps6537/ps6586/ps6638/application_note_c27-573287.pdf.*
Interop Labs, "Switch Features", Apr. 29, 2008. http://www.opus1.com/nac/teamwhitepapers/2008-09switchfeatures.pdf.*
Aboba et al., "Extensible Authentication Protocol (EAP)", Network Working Group, RFC3748, Jun. 2004, 67 pages.
Juniper Networks Inc., "Understanding 802.1X MAC Radius Authentication on EX-series Switches", Apr. 2, 2009, 2 pages.
Cisco, "Introduction to IEEE 802.1X and Cisco Identity-Based Networking Services (IBNS)", 2008, 24 pages.

* cited by examiner

*Primary Examiner* — Ayaz Sheikh
*Assistant Examiner* — Tarell Hampton
(74) *Attorney, Agent, or Firm* — Harrity & Harrity, LLP (57) ABSTRACT

A network device may include a supplicant framework to generate a first 802.1x packet using a MAC address, associated with a first device as a first username and password in the first 802.1x packet; and generate a second 802.1x packet using a second username and password received from a second device via a captive-portal web page. The network device may further include an authenticator state machine to authenticate the first device with a Remote Authentication Dial In User Service (RADIUS) server using a first Extensible Authentication Protocol (EAP) packet that includes the first 802.1x packet; authenticate the second device with the RADIUS server using a second EAP packet that includes the second 802.1x packet; receive a third EAP packet from a third device; and authenticate the third device with the RADIUS server using the third EAP packet.

20 Claims, 10 Drawing Sheets

SUPPLICANT FRAMEWORK TO HANDLE CLIENTLESS DEVICES ON A DOT1X PLATFORM

BACKGROUND

Communication networks typically include network elements, such as routers, switches, or gateways, which transfer or switch data from one or more sources to one or more destinations. A network element may process data units. A data unit may correspond to a frame, a packet, or an optical data unit. For example, the network element may receive a data unit from a source device (or another network element), may determine a destination for the data unit, and may send an original or a modified data unit to a destination device (or another network element).

Before a particular device is allowed to send data units to another device or to receive data units from the other device via a network, the particular device may need to be authenticated, by a network element, to access the network. Different devices may require different methods of authentication. Configuring a network element to perform authentication for different kinds of devices may be quite challenging.

SUMMARY OF THE INVENTION

According to one aspect, a network device may include a supplicant framework to generate a first 802.1x packet using a media access control (MAC) address, associated with a first device as a first username and password in the first 802.1x packet; and generate a second 802.1x packet using a second username and password received from a second device via a captive-portal web page. The network device may further include an authenticator state machine to authenticate the first device with a Remote Authentication Dial In User Service (RADIUS) server using a first Extensible Authentication Protocol (EAP) packet that includes the first 802.1x packet; authenticate the second device with the RADIUS server using a second EAP packet that includes the second 802.1x packet; receive a third EAP packet from a third device; and authenticate the third device with the RADIUS server using the third EAP packet.

According to another aspect, a method performed by a network device, may include receiving, by the network device, a data unit from a particular device; sending, by the network device, an Extensible Authentication Protocol (EAP) request to the particular device; determining, by the network device, whether a first EAP packet is received from the particular device; authenticating, by the network device, the particular device with a Remote Authentication Dial In User Service (RADIUS) server using the first EAP packet, when the first EAP packet is received from the particular device; determining, by the network device, whether an Hypertext Transfer Protocol (HTTP) packet was received from the particular device, when the first EAP packet is not received from the particular device; authenticating, by the network device, the particular device using a captive-portal and using a second EAP packet, when the first EAP packet is not received from the particular device and when an HTTP packet is received from the particular device; and authenticating, by the network device, the particular device using a media access control (MAC) address associated with the particular device and using a third EAP packet, when the first EAP packet is not received from the particular device and when the HTTP packet is not received from the particular device.

According to yet another aspect, a computer-readable medium, storing instructions executable by a processor, may include one or more instructions to receive a data unit from a particular device; one or more instructions to send an Extensible Authentication Protocol (EAP) request to the particular device; one or more instructions to determine whether a first EAP packet is received from the particular device; one or more instructions to authenticate the particular device with a Remote Authentication Dial In User Service (RADIUS) server using the first EAP packet, when the first EAP packet is received from the particular device; one or more instructions to determine whether an Hypertext Transfer Protocol (HTTP) packet was received from the particular device, when the first EAP packet is not received from the particular device; one or more instructions to authenticate the particular device using a captive-portal and using a second EAP packet, when the first EAP packet is not received from the particular device and when an HTTP packet is received from the particular device; and one or more instructions to authenticate the particular device using a media access control (MAC) address associated with the particular device and using a third EAP packet, when the first EAP packet is not received from the particular device and when the HTTP packet is not received from the particular device.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention.

An implementation described herein may relate to a supplicant framework to handle clientless hosts on a platform based on the Institute of Electrical and Electronics Engineers (IEEE) 802.1x authentication protocols (sometimes referred to as "dot1X platform"). A device with an installed 802.1x client may authenticate using Extensible Authentication Protocol (EAP). An 802.1x client (also known as an "802.1x supplicant") may correspond to a software (or a combination of software and hardware) application that seeks to be authenticated by Remote Authentication Dial In User Service (RADIUS) server using 802.1x protocols. However, many devices do not include an 802.1x client and such devices may need to use a different method to authenticate with a RADIUS server. For example, a device such as a phone, a fax machine, or a printer may authenticate with the RADIUS server using a media access control (MAC) address associated with the device. As another example, a device with an installed browser (e.g., a device that is able to communicate via Hypertext Transfer Protocol (HTTP)) may authenticate using a captive-portal web page.

An implementation described herein may use a same type of communication with a RADIUS server to accomplish authentication for different types of devices. For example, rather than using a service type 10 for MAC authentication (e.g., using a username and password as a calling station identifier), using a service type 5 for a captive-portal authentication (e.g., using a service type dedicated for web-based application), and using a service type 2 for authenticating devices with an 802.1x client (e.g., using EAP methods), an implementation described herein may use a same service type (e.g., service type 2) for MAC authentication, for captive-portal authentication, and for authenticating devices with an 802.1x client.

Authentication may be accomplished using a supplicant framework that manages supplicants associated with different types of devices. For example, a MAC-RADIUS supplicant may obtain a MAC address associated with a clientless device and may provide the MAC address to the supplicant framework, whereupon the supplicant framework may generate an 802.1x packet using the MAC address as a username and password. As another example, a captive-portal supplicant detects HTTP packets, may provide a captive-portal web page to a device in response to detecting an HTTP packet, may receive a username and password from the device, and may provide the username and password to the supplicant framework, whereupon the supplicant framework may generate an 802.1x packet with the username and password. As yet another example, a wireless device identifier supplication may obtain a wireless device identifier from a clientless device and may provide the wireless device identifier to the supplication framework, whereupon the supplicant framework may generate an 802.1x packet using the wireless device identifier as a username and password.

Furthermore, the supplicant framework may be extendible to generate additional supplicants for new types of devices. For example, the supplicant framework may detect a new type of device, determine a new type of identifier associated with the new type of device, and generate a new supplicant to obtain the new type of identifier, and provide the new type of identifier to the supplicant framework, whereupon the supplicant framework may generate an 802.1x packet using the new type of identifier as a username and password.

An 802.1x authenticator state machine may receive 802.1x packets from the supplicant framework, may generate EAP packets based on the received 802.1x packets, and may request authentication from a RADIUS server using the generated EAP packets. The 802.1x authenticator state machine may also receive EAP packets from devices that include an 802.1x client and may forward the EAP packets to the RADIUS server. The 802.1x authenticator state machine may receive responses from the RADIUS server and may authorize or deny access to a network to a device based on the response received from the RADIUS server.

Figure 1:
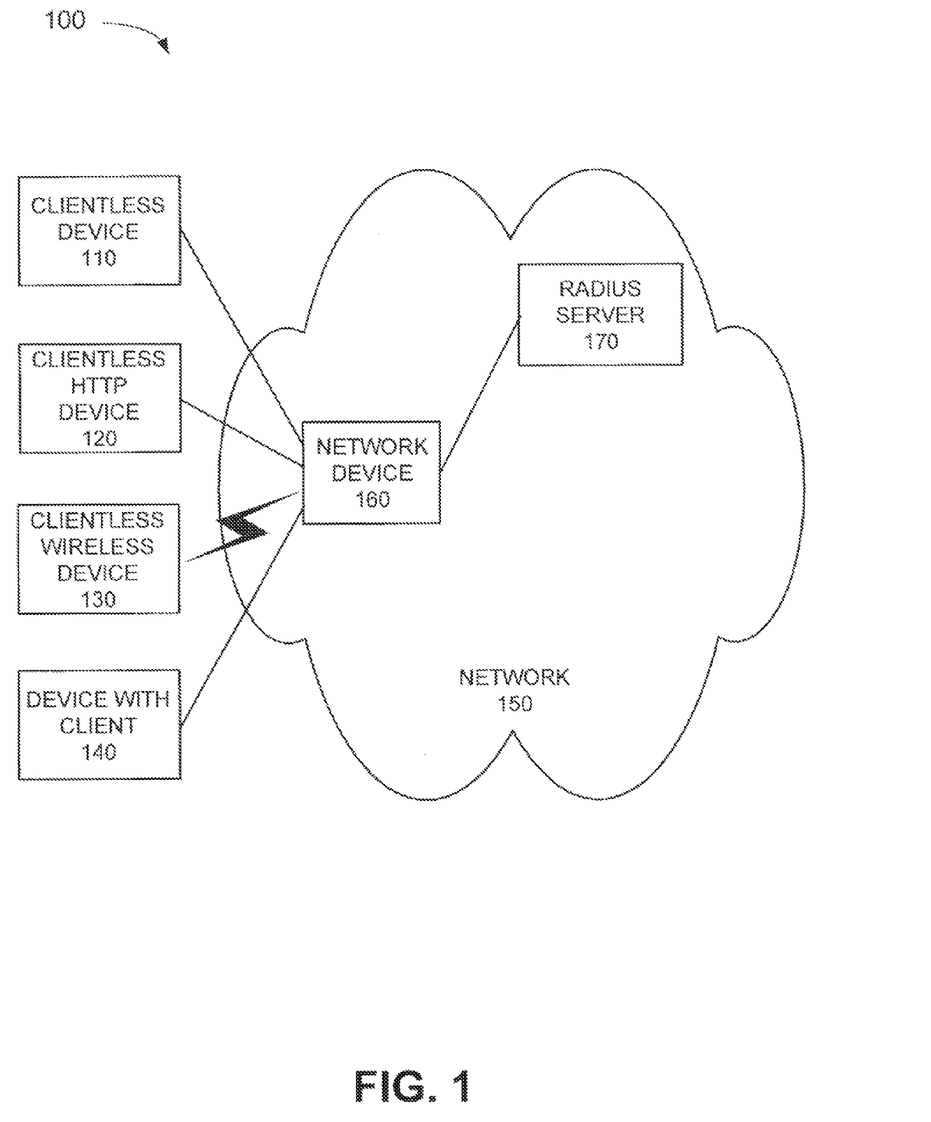
FIG. 1 is a diagram illustrating an example system according to an implementation described herein.

FIG. 1 is a diagram illustrating an example system 100 according to an implementation described herein. As shown in FIG. 1, system 100 may include a clientless device 110, a clientless HTTP device 120, a clientless wireless device 130, a device with client 140, a network 150, a network device 160, and a RADIUS server 170. While FIG. 1 illustrates an individual clientless device 110, an individual clientless HTTP device 120, an individual clientless wireless device 130, and an individual device with client 140; in practice, system 100 may include multiple clientless devices 110, multiple clientless HTTP devices 120, multiple clientless wireless devices 130, and/or multiple devices with client 140.

Clientless device 110 may include a device with a MAC address capable of communicating with network 150, where the device does not include an 802.1x client. For example, clientless device 110 may include a printer, a fax machine, a voice over Internet Protocol (VoIP) telephone device, a radio-telephone, a content capturing device (e.g., a camera, a video camera, microphone, etc.), a sensor, a media playing device (e.g., a television, a digital audio player, a speaker, a projector, etc.), a gaming system, or any other device with a MAC address and that does not include an 802.1x client.

Clientless HTTP device 120 may include a device that includes HTTP functionality without an 802.1x client. For example, clientless HTTP device 120 may include a personal computer or workstation, a server device, a portable computer, or any other device with an installed browser application (e.g., Microsoft Explorer, Mozilla Firefox, Google Chrome, Apple Safari, Netscape Navigator, etc.) and that does not include an 802.1x client.

Clientless wireless device 130 may include a device capable of communicating with network 150 via wireless signals. For example, clientless wireless device 130 may include a mobile communication device, such as a mobile phone, a smart phone, a personal digital assistant (PDA), a global positioning system (GPS) device, or a media playing device with communication capabilities; a desktop device, such as a personal computer or a workstation, with a wireless network card; a laptop computer with a wireless network card; a content capturing device (e.g., a camera, a video camera, a microphone, etc.) with a wireless transceiver; a media playing device (e.g., a television, a digital audio player, a speaker, a projector, etc.) with a wireless transceiver; and/or any other type of device with wireless communication capabilities.

Device with client 140 may include a device that includes an 802.1x client. For example, device with client 140 may include a personal computer or workstation, a server device, a portable computer, or a mobile communication device with an installed 802.1x client. An 802.1x client (also known as an "802.1x supplicant") may correspond to a software (or a combination of software and hardware) application that seeks to be authenticated by RADIUS server 170 using 802.1x protocols.

Network 150 may include one or more of a same type of packet-switched networks, or one or more packet-switched networks of different types. A "packet" may refer to a packet, a datagram, or a cell; a fragment of a packet, a fragment of a datagram, or a fragment of a cell; or another type, arrangement, or packaging of data. For example, network 130 may include one or more of a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of these networks or other types of networks.

Network element 160 may include any device that receives and transmits packets within network 150. Network element 160 may include, for example, a gateway, a router, a switch, a firewall, a network interface card (NIC), a hub, a bridge, a proxy server, an optical add-drop multiplexer (OADM), or some other type of device (e.g., a layer 2 and/or layer 3 device) that processes and/or transfers traffic. Additionally or alternatively, network element 160 may include a wireless transceiver (e.g., a WiFi access point, a Bluetooth access point, a mobile communication device base station, etc.). Network element 160 may perform authentication of clientless device 110, clientless HTTP device 120, clientless wireless device 130, and device with client 140 by communicating with RADIUS server 170 using 802.1x protocols. Network element 160 may authorize access to network 150 for a particular device based on whether the particular device was authenticated by RADIUS server 170. In one example, network element 160 may correspond to a layer 2 switch. In another example, network element 160 may correspond to a different type of device.

RADIUS server 170 may include one or more devices (e.g., server devices) that perform authentication of devices using 802.1x protocols. RADIUS server 170 may receive a request for authentication (e.g., a RADIUS Access Request message) that includes a username and password and may check whether the username and password are valid. In one example, RADIUS server 170 may check whether the username and password are valid by accessing a local database. In another example, RADIUS server 170 may check whether the username and password are valid by communicating with an external database (not shown in FIG. 1). RADIUS server 170 may respond to the request for authentication by accepting or rejecting authentication (e.g., an Access Accept or an Access Reject message) based on whether the username and password received by RADIUS server 170 matched a username and password stored in the accessed database.

Although FIG. 1 shows example components of system 100, in other implementations, system 100 may include fewer components, different components, differently arranged components, and/or additional components than depicted in FIG. 1. Additionally or alternatively, one or more components of system 100 may perform one or more tasks described as being performed by one or more other components of system 100.

Figure 2:
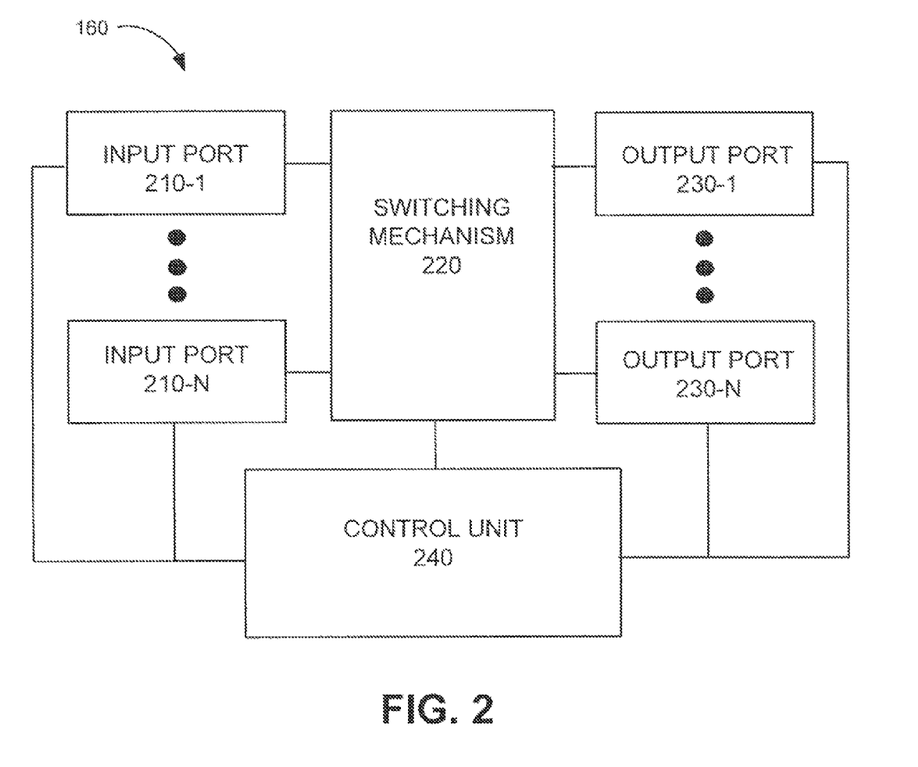
FIG. 2 is a diagram illustrating example components of a network device according to an implementation described herein.

FIG. 2 is a diagram illustrating example components of network device 160 of the system of FIG. 1 according to an implementation described herein. As shown in FIG. 2, network device 160 may include one or more input ports 210-1 to 210-N (referred to herein individually as "input port 210" and collectively as "input ports 210"), a switching mechanism 220, one or more output ports 230-1 to 230-N (referred to herein individually as "output port 230" and collectively as "output ports 230"), and/or a control unit 240.

Input ports 210 may be the points of attachments for physical links and may be the points of entry for incoming traffic. An input port 210 may be associated with an interface card (not shown in FIG. 2). Switching mechanism 220 may include one or more switching planes to facilitate communication between input ports 210 and output ports 230. In one implementation, each of the switching planes may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card (not shown in FIG. 2). Control unit 240 may interconnect with input ports 210, switching mechanism 220, and/or output ports 230 and may control operation of network device 160. For example, if network device 160 corresponds to a router, control unit 240 may perform control plane operations associated with network device 160 (e.g., control unit 240 may use routing protocols and may create a forwarding table that is used in traffic forwarding).

Although FIG. 2 shows example components of network device 160, in other implementations, network device 160 may include fewer components, different components, differently arranged components, and/or additional components than depicted in FIG. 2. Additionally or alternatively, one or more components of network device 160 may perform one or more tasks described as being performed by one or more other components of network device 160.

Figure 3:
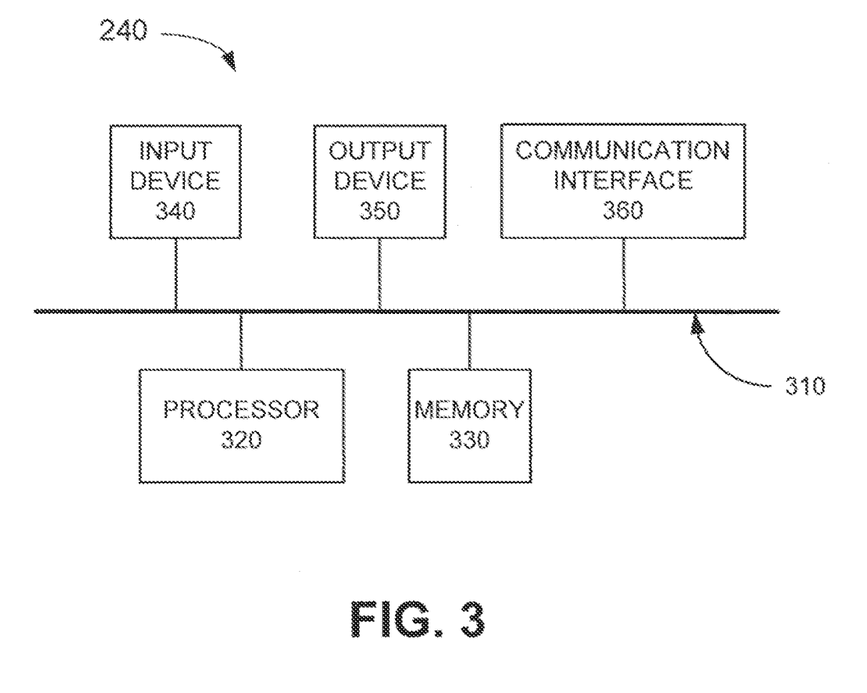
FIG. 3 is a diagram illustrating example components of a control unit of a network device according to an implementation described herein.

FIG. 3 is a diagram illustrating example components of control unit 240 according to a first implementation described herein. As shown in FIG. 3, control unit 240 may include a bus 310, a processor 320, a memory 330, an input device 340, an output device 350, and a communication interface 360.

Bus 310 may include a path that permits communication among the components of control unit 240. Processor 320 may include one or more processors, microprocessors, and/or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to control unit 240, such as a keypad, a button, a pen, a touch screen, voice recognition and/or biometric mechanisms, etc. Output device 350 may include a mechanism that outputs information to the operator, including one or more light indicators, a display, a speaker, etc.

Communication interface 360 may include any transceiver-like mechanism that enables control unit 240 to communicate with other devices and/or systems. For example, communication interface 360 may include a modem, a network interface card, and/or a wireless interface card.

As will be described in detail below, control unit 240 may perform certain operations. Control unit 240 may perform these operations in response to processor 320 executing software instructions contained in a computer-readable medium, such as memory 330. A computer-readable medium may be defined as one or more non-transitory memory devices. A memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of control unit 240, in other implementations, control unit 240 may contain fewer components, different components, additional components, or differently arranged components than depicted in FIG. 3. Additionally or alternatively, one or more components of control unit 240 may perform one or more tasks described as being performed by one or more other components of control unit 240.

Figure 4:
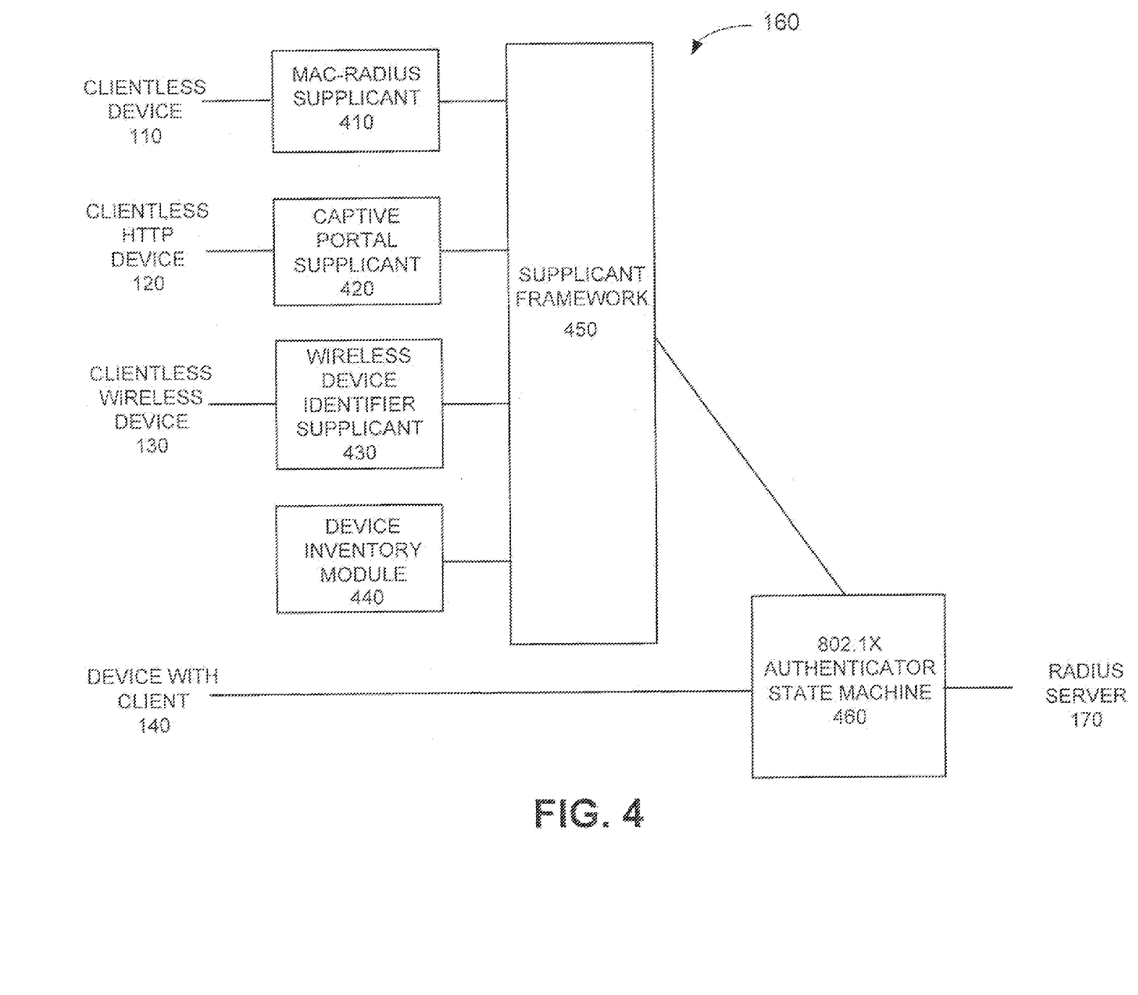
FIG. 4 is a diagram illustrating example functional components of a control unit of a network device according to an implementation described herein.

FIG. 4 is a first diagram illustrating example functional components of network device 160 according to an implementation described herein. As shown in FIG. 4, network device 160 may include a MAC-RADIUS supplicant 410, a captive-portal supplicant 420, a wireless device identifier supplicant 430, a device inventory module 440, a supplicant framework 450, and an 802.1x authenticator state machine 460.

MAC-RADIUS supplicant 410 may receive a data unit (e.g., an Ethernet frame or a packet) from clientless device 110 and may determine a MAC address associated with clientless device 110 from the received data unit by, for example, retrieving a source MAC address from the data unit. MAC-RADIUS supplicant 410 may provide the determined MAC address to supplicant framework 450.

Captive-portal supplicant 420 may intercept an HTTP packet sent by clientless HTTP device 120 and may provide a captive-portal web page to clientless HTTP device 120 in response to intercepting the HTTP packet. The captive-portal web page may include text requesting that a user of clientless HTTP device 120 log in and may include a first entry box for the user to enter a username and a second entry box for the user to enter a password. Captive-portal supplicant 420 may receive a username and password from clientless HTTP device 120 and may provide the received username and password to supplicant framework 450.

Wireless device identifier supplicant 430 may receive a data unit from clientless wireless device 130 and may determine a wireless device identifier associated with clientless wireless device 130 based on the received data unit. In one example, the wireless device identifier may correspond to a WiFi Service Set Identifier (SSID) or a Bluetooth Universally Unique Identifier (UUI). In another example, the wireless device identifier may correspond to an International Circuit Card Identifier (ICCID) associated with a Subscriber Identity Module (SIM) associated with clientless wireless device 130, an International Mobile Subscriber Identity (IMSI) associated with clientless wireless device 130, a Mobile Identification Number (MIN) associated with clientless wireless device 130, a Mobile Subscriber International Subscriber Directory Number (MSISDN), a Globally Unique Temporary Identifier (GUTI), or any other identifier used by network 150, or by another network, to identify clientless wireless device 130.

Device inventory module 440 may capture an IP address associated with clientless device 110, clientless HTTP device 120, and/or clientless wireless device 130 and may store the captured IP address in association with the device from which the IP address was received. For example, clientless device 110, clientless HTTP device 120, or clientless wireless device 130 may communicate with network element 160 using IP packets and device inventory module 440 may retrieve a source IP address from an IP packet received from clientless device 110, clientless HTTP device 120, or clientless wireless device 130 and/or may retrieve a destination IP address from an IP packet destined for clientless device 110, clientless HTTP device 120, or clientless wireless device 130.

Supplicant framework 450 may receive a MAC address from MAC-RADIUS supplicant 410, may generate an 802.1x packet using the received MAC address as a username and password, and may provide the generated 802.1x packet to 802.1x authenticator state machine 460. Supplicant framework 450 may receive a username and password from captive-portal supplicant 420, may generate an 802.1x packet using the received username and password, and may provide the generated 802.1x packet to 802.1x authenticator state machine 460. Supplicant framework 450 may receive a wireless device identifier from wireless device identifier supplicant 430, may generate an 802.1x packet using the received wireless device identifier as a username and password, and may provide the generated 802.1x packet to 802.1x authenticator state machine 460.

Supplicant framework 450 may also detect a new type of device that does not include an 802.1x client and that is not associated with a supplicant and may create a new supplicant for the new device. The new supplicant may detect a new type of identifier associated with the new device and may generate an 802.1x packet using the new type of identifier as a username and password. Thus, supplicant framework 450 may be extendible to accommodate authentication for a new type of device that is not handled by any existing supplicants.

Supplicant framework 450 may also provide a captured IP address, associated with a particular device, to RADIUS server 170 and may receive an IP policy, associated with the particular device, from RADIUS server 170. Supplicant framework 450 may apply the IP policy to authorize access for the particular device to network 150.

802.1x authenticator state machine 460 may receive an 802.1x packet from supplicant framework 450, may encapsulate the 802.1x packet into an EAP Request Access packet, and may send the EAP Request Access packet to RADIUS server 170. 802.1x authenticator state machine 460 may also receive an EAP packet from device with client 140, and may send a Request Access packet to RADIUS server 170 based on the received EAP packet. 802.1x authenticator state machine 460 may receive a response from RADIUS server 170 as either an Access Granted EAP packet or as an Access Denied EAP packet. 802.1x authenticator state machine 460 may authorize access to network 150 if an Access Granted EAP packet was received and may not authorize access to network 150 if an Access Denied EAP packet was received. 802.1x authenticator state machine 460 may also maintain a list of devices that have been authenticated.

Although FIG. 4 shows example functional components of network device 160, in other implementations, network device 160 may include fewer functional components, different functional components, differently arranged functional components, and/or additional functional components than depicted in FIG. 4. Additionally or alternatively, one or more functional components of network device 160 shown in FIG. 4 may perform one or more tasks described as being performed by one or more other functional components of network device 160 shown in FIG. 4.

Figure 5:
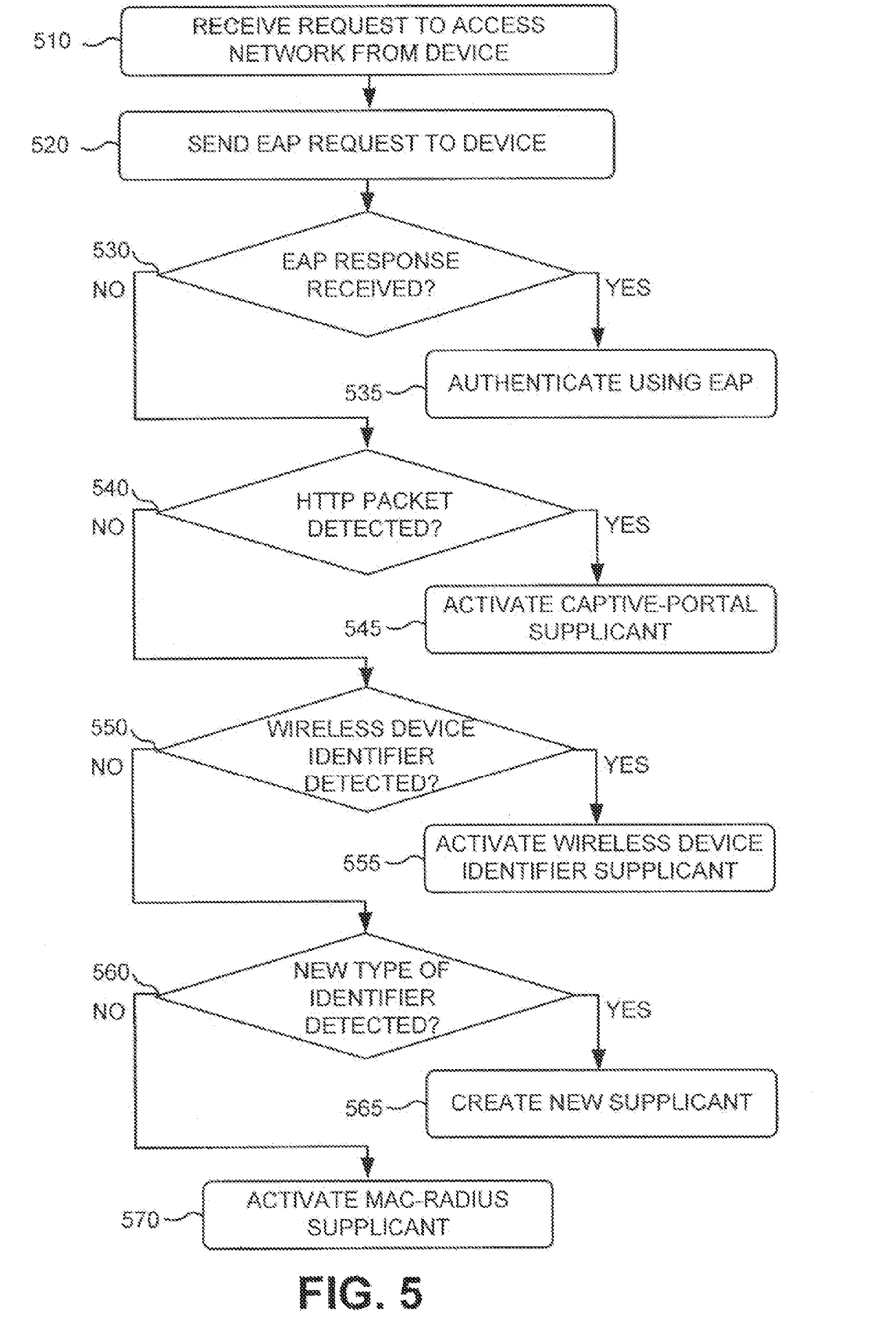
FIG. 5 is a diagram of a flow chart illustrating an example process of determining how to authenticate a device according to an implementation described herein.

FIG. 5 is a diagram of a flow chart illustrating an example process of determining how to authenticate a device according to an implementation described herein. In one implementation, the process of FIG. 5 may be performed by network device 160. In other implementations, some or all of the process of FIG. 5 may be performed by another device or a group of devices separate and/or possibly remote from or including network device 160.

The process of FIG. 5 may include receiving a request to access a network from a device (block 510). For example, network device 160 may receive a data unit from a device, such as clientless device 110, clientless HTTP device 120, clientless wireless device 130, device with client 140, or another type of device (not shown in FIG. 1). 802.1x authenticator state machine 460 may determine that the data unit was received from a device that has not been authenticated and may block the data unit from being forwarded toward a next hop destination. An EAP request may be sent to the device (block 520). For example, 802.1x authenticator state machine 460 may send an EAP request message to the device, asking the device to provide credentials for authentication.

A determination may be made whether an EAP response was received from the device (block 530). For example, 802.1x authenticator state machine 460 may wait for a particular length of time for a response before determining whether an EAP response has been received. If no response is received, 802.1x authenticator state machine 460 may resend the EAP request a particular number of times before making the determination.

If it is determined that an EAP response was received (block 530—YES), authentication may be performed using EAP (block 535). For example, 802.1x authenticator state machine 460 may receive an EAP response from device with client 140. The EAP response may include credentials associated device with client 140 (e.g., a username and password or an X.509 certificate). 802.1x authenticator state machine 460 may forward the EAP response to RADIUS server 170 and may receive a response from RADIUS server 170 indicating whether device with client 140 has been authenticated. 802.1x authenticator state machine 460 may then authorize access to network 150 for device with client 140 if device with client 140 has been authenticated, or may not authorize access to network 150 to device with client 140 if device with client 140 has not been authenticated.

If it is determined that no EAP response was received (block 530—NO), a determination may be made as to whether an HTTP packet has been detected (block 540). For example, 802.1x authenticator state machine 460 may activate supplicant framework 450 if no EAP response has been received within a particular period of time. In one example, supplicant framework 450 may determine whether the data unit that has been received corresponds to an HTTP packet. In another example, supplicant framework 450 may send a test HTTP packet to the device, from which the request to access network 150 has been received, to determine whether the device will respond with an HTTP packet.

If it is determined that an HTTP packet has been detected (block 540—YES), a captive-portal supplicant may be activated (block 545). For example, supplicant framework 450 may determine that an HTTP packet has been detected from clientless HTTP device 120 and may activate captive-portal supplicant 420. Processing may continue as described below with reference to FIG. 6.

If it is determined that no HTTP packet has been detected (block 540—NO), a determination may be made whether a wireless device identifier has been detected (block 550). For example, supplicant framework 450 may determine that no HTTP packet has been detected. In one example, supplicant framework 450 may determine whether the data unit that has been received includes a wireless device identifier. In another example, supplicant framework 450 may send a test wireless data unit to the device, from which the request to access network 150 has been received, to determine whether the device will respond with a data unit that includes a wireless device identifier.

If it is determined that a wireless device identifier has been detected (block 550—YES), a wireless device identifier supplicant may be activated (block 555). For example, supplicant framework 450 may determine that a wireless device identifier has been detected from clientless wireless device 130 and may activate wireless device identifier supplicant 430. Processing may continue as described below with reference to FIG. 7.

If it is determined that no wireless device identifier has been detected (block 550—NO), a determination may be made whether a new type of device identifier has been detected (block 560). For example, supplicant framework 450 may detect a new type of device identifier. In one example, supplicant framework 450 may store a list of possible device identifiers and may match an identifier, received in a data unit from a device seeking access to network 150, with a stored identifier. In another example, supplicant framework 450 may receive information about a new type of identifier from another device in network 150 (e.g., from RADIUS server 170). In yet another example, supplicant framework 450 may receive information about the new type of identifier from the device seeking access to network 150. In yet another example, supplicant framework 450 may be manually programmed to detect a new type of identifier by an administrator.

If it is determined that a new type of identifier has been detected (block 560—YES), a new supplicant may be created (block 565). Processing may continue as described below with reference to FIG. 8.

If it is determined that a new type of identifier has not been detected (block 560—NO), a MAC-RADIUS supplicant may be activate (block 570). For example, if supplicant framework 450 does not detect any other type of identifier from clientless device 110, supplicant framework 450 may default to activating MAC-RADIUS supplicant 410. Processing may continue as describe below with reference to FIG. 9.

Figure 6:
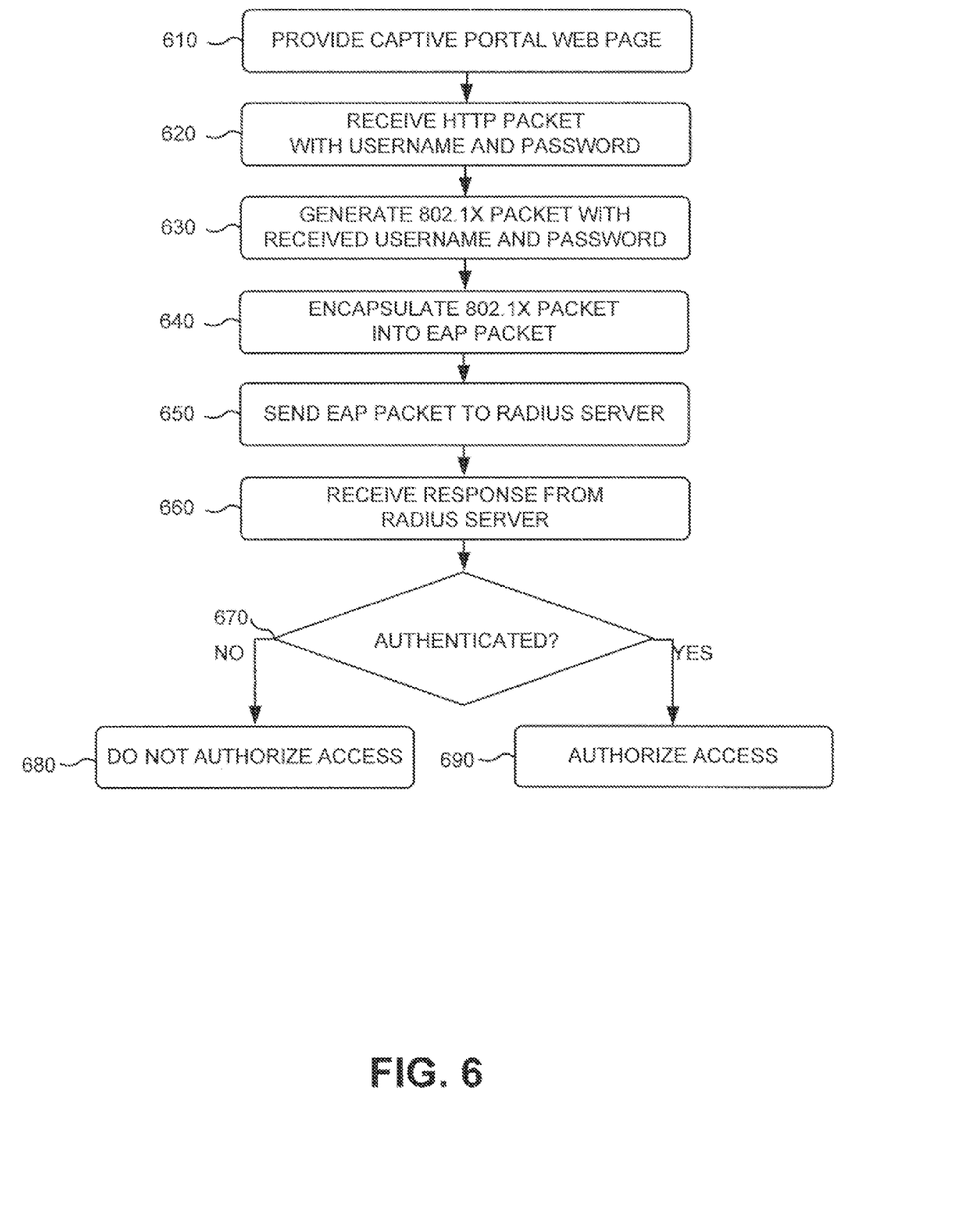
FIG. 6 is a diagram of a flow chart illustrating a first example process of authenticating a clientless device according to an implementation described herein.

FIG. 6 is a diagram of a flow chart illustrating an example process of authenticating clientless HTTP device 120 according to an implementation described herein. In one implementation, the process of FIG. 6 may be performed by network device 160. In other implementations, some or all of the process of FIG. 6 may be performed by another device or a group of devices separate and/or possibly remote from or including network device 160.

The process of FIG. 6 may include providing a captive-portal web page (block 610). For example, captive-portal supplicant 420 may provide a captive-portal web page to clientless HTTP device 120 in response to detecting an HTTP packet. The captive-portal web page may include text requesting that a user of clientless HTTP device 120 log in and may include a first entry box for the user to enter a username and a second entry box for the user to enter a password.

An HTTP packet may be received with a username and password (block 620). For example, captive-portal supplicant 420 may receive a username and password from clientless HTTP device 120 and may provide the received username and password to supplicant framework 450. An 802.1x packet may be generated with the received username and password (block 630). For example, supplicant framework 450 may generate an 802.1x packet with the received username and password.

The 802.1x packet may be encapsulated into an EAP packet (block 640) and the EAP packet may be sent to a RADIUS server (block 650). For example, 802.1x authenticator state machine 460 may encapsulate into an EAP packet and may send the EAP packet to RADIUS server 170 via a service type 2 connection.

A response may be received from the RADIUS server (block 660). For example, 802.1x authenticator state machine 460 may receive an EAP packet from RADIUS server 170. The EAP packet may correspond to an Access Granted EAP packet or to an Access Denied EAP packet. A determination may be made whether the device was authenticated (block 670). For example, 802.1x authenticator state machine 460 may determine whether the received EAP packet grants authentication or denies authentication to clientless HTTP device 120.

If it determined that the device was not authenticated (block 670—NO), access may not be authorized (block 680). For example, 802.1x authenticator state machine 460 may not allow clientless HTTP device 120 to send or receive traffic via network device 160. If it is determined that the device was authenticated (block 670—YES), access may be authorized (block 690). For example, 802.1x authenticator state machine 460 may allow clientless HTTP device 120 to send and receive traffic via a particular port of network device 160 associated with clientless HTTP device 120.

Figure 7:
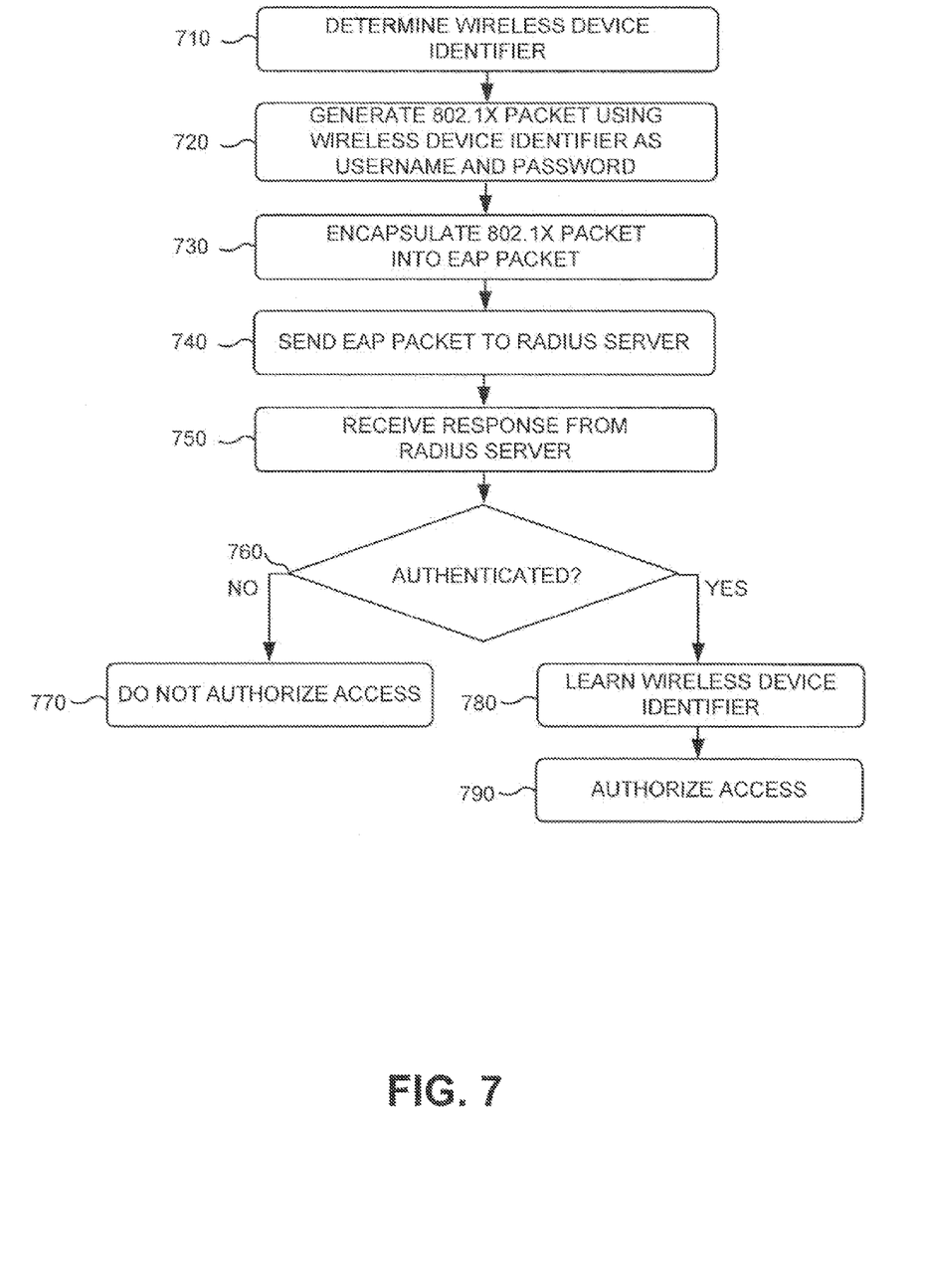
FIG. 7 is a diagram of a flow chart illustrating a second example process of authenticating a clientless device according to an implementation described herein.

FIG. 7 is a diagram of a flow chart illustrating an example process of authenticating clientless wireless device 130 according to an implementation described herein. In one implementation, the process of FIG. 7 may be performed by network device 160. In other implementations, some or all of the process of FIG. 7 may be performed by another device or a group of devices separate and/or possibly remote from or including network device 160.

The process of FIG. 7 may include determining a wireless device identifier (block 610). For example, wireless device identifier supplicant 430 may detect a wireless device identifier in a data unit received from clientless wireless device 130 and provide the detected wireless device identifier to supplicant framework 450 as a username and password.

An 802.1x packet may be generated with the received username and password (block 720). For example, supplicant framework 450 may generate an 802.1x packet with the received username and password. The 802.1x packet may be encapsulated into an EAP packet (block 730) and the EAP packet may be sent to a RADIUS server (block 740). For example, 802.1x authenticator state machine 460 may encapsulate the 802.1x packet into an EAP packet and may send the EAP packet to RADIUS server 170 via a service type 2 connection.

A response may be received from the RADIUS server (block 750). For example, 802.1x authenticator state machine 460 may receive an EAP packet from RADIUS server 170. The EAP packet may correspond to an Access Granted EAP packet or to an Access Denied EAP packet. A determination may be made as to whether the device was authenticated (block 760). For example, 802.1x authenticator state machine 460 may determine whether the received EAP packet grants authentication or denies authentication to clientless wireless device 130.

If it determined that the device was not authenticated (block 760—NO), access may not be authorized (block 770). For example, 802.1x authenticator state machine 460 may not allow clientless wireless device 130 to send or receive traffic via network device 160. If it is determined that the device was authenticated (block 760—YES), the wireless device identifier may be learned (block 780) and access may be authorized (block 790). For example, 802.1x authenticator state machine 460 may store the wireless device identifier as a username and password for clientless wireless device 130 and may allow clientless wireless device 130 to send and receive traffic via a particular port of network device 160 associated with clientless wireless device 130.

Figure 8:
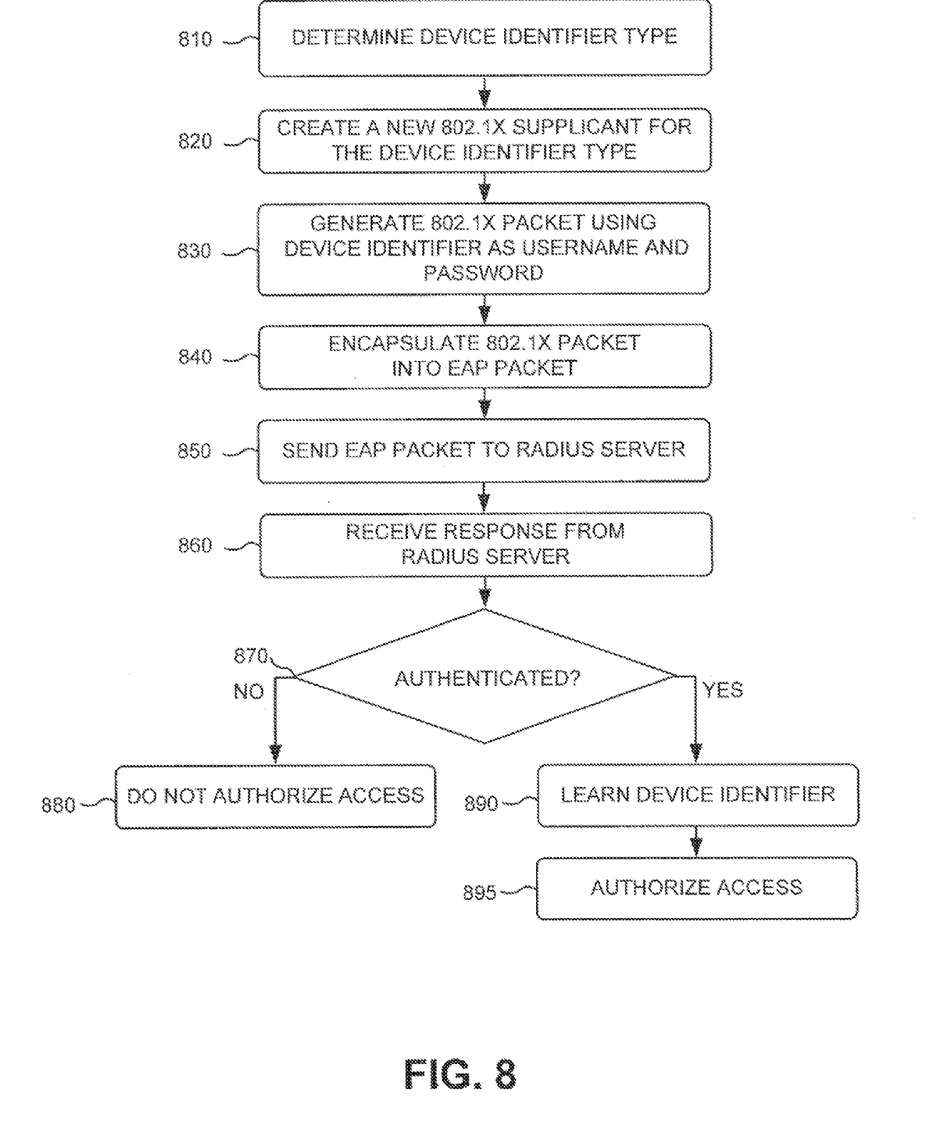
FIG. 8 is a diagram of a flow chart illustrating an example process of extending a supplicant framework to handle a new type of device according to an implementation described herein.

FIG. 8 is a diagram of a flow chart illustrating an example process of creating a new type of supplicant according to an implementation described herein. In one implementation, the process of FIG. 8 may be performed by network device 160. In other implementations, some or all of the process of FIG. 8 may be performed by another device or a group of devices separate and/or possibly remote from or including network device 160.

The process of FIG. 8 may include determining a device identifier type (block 810). For example, supplicant framework 450 may detect a new type of identifier in a data unit received from a new clientless device. As explained above, supplicant framework 450 may store a list of possible device identifiers and may match an identifier, received in a data unit from a device seeking access to network 150, with a stored identifier; may receive information about a new type of identifier from another device in network 150 (e.g., from RADIUS server 170); may receive information about the new type of identifier from the device seeking access to network 150; and/or may be manually programmed to detect a new type of identifier by an administrator.

A new 802.1x supplicant may be created for the new device identifier type (block 820). For example, supplicant framework 450 may create a new supplicant to handle clientless devices that are associated with the new device identifier type. The new 802.1x supplicant may forward the new device identifier to supplicant framework 450 as a username and password.

An 802.1x packet may be generated with the received username and password (block 830). For example, supplicant framework 450 may generate an 802.1x packet with the received username and password. The 802.1x packet may be encapsulated into an EAP packet (block 840) and the EAP packet may be sent to a RADIUS server (block 850). For example, 802.1x authenticator state machine 460 may encapsulate the 802.1x packet into an EAP packet and may send the EAP packet to RADIUS server 170 via a service type 2 connection.

A response may be received from the RADIUS server (block 860). For example, 802.1x authenticator state machine 460 may receive an EAP packet from RADIUS server 170. The EAP packet may correspond to an Access Granted EAP packet or to an Access Denied EAP packet. A determination may be made whether the new clientless device was authenticated (block 870). For example, 802.1x authenticator state machine 460 may determine whether the received EAP packet grants authentication or denies authentication to the new clientless device.

If it determined that the device was not authenticated (block 870—NO), access may not be authorized (block 880). For example, 802.1x authenticator state machine 460 may not allow the new clientless device to send or receive traffic via network device 160. If it is determined that the device was authenticated (block 870—YES), the new device identifier may be learned (block 890) and access may be authorized (block 895). For example, 802.1x authenticator state machine 460 may store the new device identifier as a username and password for the new device and may allow the new clientless device to send and receive traffic via a particular port of network device 160 associated with the new clientless device.

Figure 9:
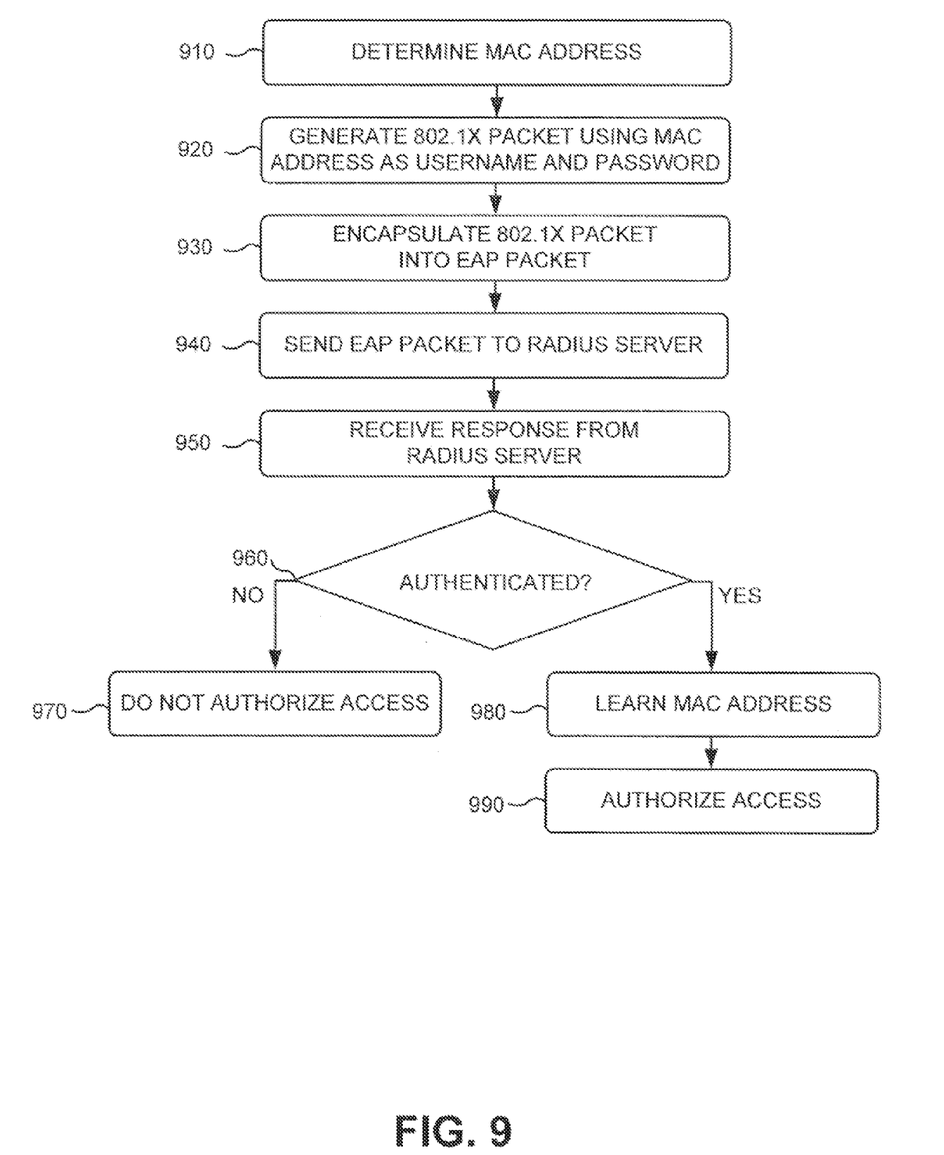
FIG. 9 is a diagram of a flow chart illustrating a third example process of authenticating a clientless device according to an implementation described herein.

FIG. 9 is a diagram of a flow chart illustrating an example process of authenticating clientless device 110 according to an implementation described herein. In one implementation, the process of FIG. 9 may be performed by network device 160. In other implementations, some or all of the process of FIG. 9 may be performed by another device or a group of devices separate and/or possibly remote from or including network device 160.

The process of FIG. 9 may include determining a MAC address (block 910). For example, MAC-RADIUS supplicant 410 may detect a MAC address by accessing a source MAC address field of a received data unit (e.g., a data unit requesting access to network 150). MAC-RADIUS supplicant 410 may forward the detected MAC address to supplicant framework 450 as a username and password for clientless device 110.

An 802.1x packet may be generated using the MAC address as a username and password (block 920). For example, supplicant framework 450 may generate an 802.1x packet with the MAC address as the username and password. The 802.1x packet may be encapsulated into an EAP packet (block 930) and the EAP packet may be sent to a RADIUS server (block 940). For example, 802.1x authenticator state machine 460 may encapsulate the 802.1x packet into an EAP packet and may send the EAP packet to RADIUS server 170 via a service type 2 connection.

A response may be received from the RADIUS server (block 950). For example, 802.1x authenticator state machine 460 may receive an EAP packet from RADIUS server 170. The EAP packet may correspond to an Access Granted EAP packet or to an Access Denied EAP packet. A determination may be made whether the device was authenticated (block 960). For example, 802.1x authenticator state machine 460 may determine whether the received EAP packet grants authentication or denies authentication to clientless device 110.

If it determined that the device was not authenticated (block 960—NO), access may not be authorized (block 970). For example, 802.1x authenticator state machine 460 may not allow clientless device 110 to send or receive traffic via network device 160. If it is determined that the device was authenticated (block 960—YES), the MAC address may be learned (block 980) and access may be authorized (block 990). For example, 802.1x authenticator state machine 460 may store the MAC address as a username and password for clientless device 110 and may allow clientless device 110 to send and receive traffic via a particular port of network device 160 associated with clientless device 110.

Figure 10:
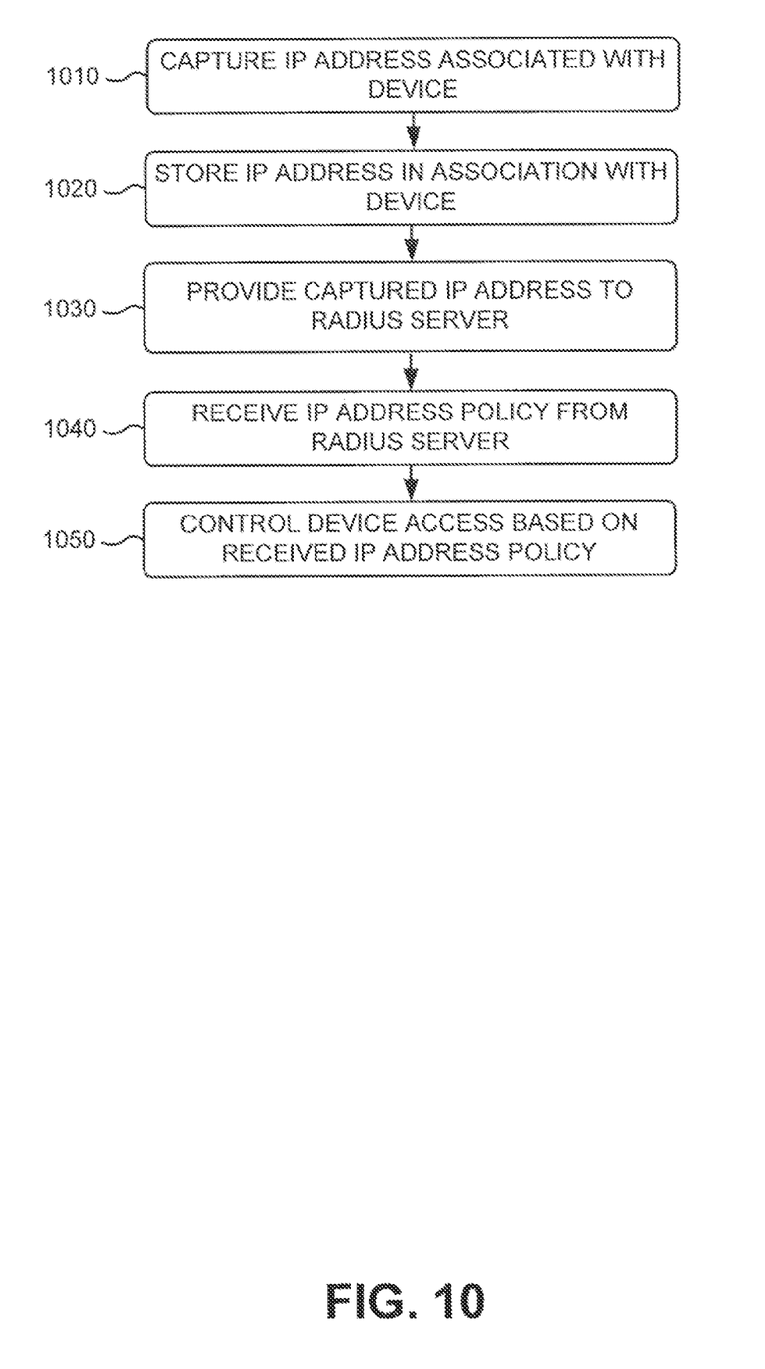
FIG. 10 is a diagram of a flow chart illustrating an example process of using an Internet Protocol address associated with a device for authenticating the device according to an implementation described herein.

FIG. 10 is a diagram of a flow chart illustrating an example process of using an Internet Protocol address associated with a device for authenticating the device according to an implementation described herein. Using an (IP) address, associated with a device, to authorize access to network 150 for the device, may allow network device 160 to exercise more sophisticated authorization methods. In one implementation, the process of FIG. 10 may be performed by network device 160. In other implementations, some or all of the process of FIG. 10 may be performed by another device or a group of devices separate and/or possibly remote from or including network device 160.

The process of FIG. 10 may include capturing an IP address associated with a device (block 1010). For example, device inventory module 440 may detect that an IP packet was received from clientless device 110, clientless HTTP device 120, or clientless wireless device 130 and may retrieve an IP address associated with clientless device 110, clientless HTTP device 120, or clientless wireless device 130 from a source IP address field of the IP packet.

The captured IP address may be stored in association with the device (block 1020). For example, device inventory module 440 may store the captured IP address in association with a port via which the IP packet was received. The captured IP address may be provided to a RADIUS server (block 1030). For example, 802.1x authenticator state machine 460 may send the IP address to RADIUS server 170 after the device, from which the IP packet was received, has been authenticated by RADIUS server 170.

An IP address policy may be received from the RADIUS server (block 1040). For example, 802.1x authenticator state machine 460 may receive an IP policy associated with the IP address from RADIUS server 170. Device access may be controlled based on the received IP address policy (block 1050). For example, 802.1x authenticator state machine 460 may determine whether to grant access to the device associated with the IP address based on the received policy. In one example, the IP policy may specify a timeout policy. The timeout policy may indicate, for example, that if a device, associated with the IP address has been authenticated, the port associated with the IP address may be authenticated for a particular period of time. If no IP packets are received within the particular period of time via the port, the authorization may be withdrawn and the device may need to re-authenticate. In another example, the IP policy may specify a list of allowed destinations. For example, network element 160 may drop any IP packets from the device that do not include a destination IP address included in the list of allowed destinations.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 5-10, the order of the blocks may be modified in other implementations. Further, non-dependent blocks may be performed in parallel.

Also, certain portions of the implementations may have been described as a "component," "supplicant," "framework," "module," or "machine" that performs one or more functions. The "component," "supplicant," "framework," "module," and "machine" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A network device comprising:
a memory to store instructions; and
a processor to execute the instructions to:
generate a first 802.1x packet using a media access control (MAC) address, associated with a first device, the first 802.1x packet including a first username and password; and
generate a second 802.1x packet using a second username and password received from a second device via a captive-portal web page;
authenticate the first device with a Remote Authentication Dial In User Service (RADIUS) server using a first Extensible Authentication Protocol (EAP) packet that includes the first 802.1x packet;
authenticate the second device with the RADIUS server using a second EAP packet that includes the second 802.1x packet;
receive a third EAP packet from a third device;
authenticate the third device with the RADIUS server using the third EAP packet;
create a supplicant to handle a previously unreceived type of identifier associated with a fourth device that does not include an 802.1x client;
generate another 802.1x packet using the previously unreceived type of identifier, associated with the fourth device, as a username and password in the other 802.1x packet; and
authenticate the fourth device with the RADIUS server using the other 802.1x packet.

2. The network device of claim 1, where the processor is further to:
detect the MAC address associated with the first device; and
provide the MAC address to a supplicant framework as the first username and password;
detect a hypertext transfer protocol (HTTP) packet from the second device;
provide the captive-portal web page to the second device based on detecting the HTTP packet;
receive the second username and password from the second device based on providing the captive-portal web page; and
provide the second username and password to the supplicant framework.

3. The network device of claim 1, where the processor is further to:
generate a third 802.1x packet using a wireless device identifier, associated with the third device, as a third username and password in the third 802.1x packet; and
authenticate the third device with the RADIUS server using the third 802.1x packet.

4. The network device of claim 3, where the processor is further to:
detect the wireless device identifier associated with the third device; and
provide the wireless device identifier to a supplicant framework as the third username and password.

5. The network device of claim 4, where the wireless device identifier corresponds to at least one of:
a WiFi Service Set Identifier (SSID),
a Bluetooth Universally Unique Identifier (UUI),
an International Circuit Card Identifier (ICCID),
an International Mobile Subscriber Identity (IMSI),
a Mobile Identification Number (MIN),
a Mobile Subscriber International Subscriber Directory Number (MSISDN), or
a Globally Unique Temporary Identifier (GUTI).

6. The network device of claim 1, where the processor is further to:
determine that the fourth device does not include the 802.1x client; and
determine that the fourth device is associated with the previously unreceived type of identifier.

7. The network device of claim 1, where the processor is further to:
capture an Internet Protocol (IP) address associated with a particular device that attempts to authenticate via the network device.

8. The network device of claim 7, where the processor is further to:
provide the captured IP address to the RADIUS server;
receive a policy associated with the captured IP address from the RADIUS server; and
control access of the particular device to a network based on the received policy.

9. The network device of claim 1, where the network device corresponds to a layer two switch.

10. A method comprising:
receiving, by a network device, a data unit from a particular device;
sending, by the network device, an Extensible Authentication Protocol (EAP) request to the particular device;
determining, by the network device, whether a first EAP packet is received from the particular device;
authenticating, by the network device and when the first EAP packet is received from the particular device, the particular device with a Remote Authentication Dial In User Service (RADIUS) server using the first EAP packet;
determining, by the network device and when the first EAP packet is not received from the particular device, whether an Hypertext Transfer Protocol (HTTP) packet was received from the particular device;
authenticating, by the network device and when the first EAP packet is not received from the particular device and when an HTTP packet is received from the particular device, the particular device using a captive-portal and using a second EAP packet;
determining, by the network device and when the HTTP packet is not received from the particular device, whether the particular device is associated with a previously unreceived type of identifier; and
authenticating, by the network device and when the particular device is associated with the previously unreceived type of identifier, the particular device using the previously unreceived type of identifier and another EAP packet; and
authenticating, by the network device and when the first EAP packet is not received from the particular device, the HTTP packet is not received from the particular device, the particular device is not associated with the previously unreceived type of identifier, and the particular device is not associated with a wireless device identifier, the particular device using a media access control (MAC) address associated with the particular device and using a third EAP packet.

11. The method of claim 10, where authenticating the particular device using the captive-portal and using the second EAP packet comprises:
   providing a captive-portal web page to the particular device based on receiving the HTTP packet, where the captive-portal web page includes requests for a username and a password;
   receiving, from the particular device, the username and the password;
   incorporating the received username and password into the second EAP packet;
   sending the second EAP packet to the RADIUS server; and
   receiving, from the RADIUS server, an indication that the particular device is authenticated.

12. The method of claim 10, where authenticating the particular device using the MAC address associated with the particular device and using a third EAP packet comprises:
   determining the MAC address associated with the particular device;
   incorporating the MAC address into the third EAP packet as a username and password;
   sending the third EAP packet to the RADIUS server; and
   receiving, from the RADIUS server, an indication that the particular device is authenticated.

13. The method of claim 10, further comprising:
   determining that the particular device is associated with the wireless device identifier, when the HTTP packet is not received from the particular device; and
   authenticating the particular device using the wireless device identifier associated with the particular device and using a fourth EAP packet, based on determining that the particular device is associated with the wireless device identifier.

14. The method of claim 13, where authenticating the particular device using the wireless device identifier associated with the particular device and using the fourth EAP packet comprises:
   determining the wireless device identifier associated with the particular device;
   incorporating the wireless device identifier into the fourth EAP packet as a username and password;
   sending the fourth EAP packet to the RADIUS server; and
   receiving, from the RADIUS server, an indication that the particular device is authenticated.

15. The method of claim 10, where authenticating the particular device using the previously unreceived type of identifier, associated with the particular device, and using the other EAP packet comprises:
   generating a supplicant to handle the previously unreceived type of identifier;
   receiving, from the supplicant, the previously unreceived type of identifier;
   incorporating the previously received type of identifier into the other EAP packet as a username and password;
   sending the other EAP packet to the RADIUS server; and
   receiving, from the RADIUS server, an indication that the particular device is authenticated.

16. The method of claim 10, further comprising:
   capturing an Internet Protocol (IP) address associated with the particular device;
   providing the captured IP address to the RADIUS server;
   receiving a policy associated with the captured IP address from the RADIUS server; and
   controlling access of the particular device to a network based on the received policy.

17. The method of claim 16, where the policy includes at least one of a timeout policy or a list of allowed destinations.

18. A non-transitory computer-readable medium storing instructions, the instructions comprising:
   one or more instructions which, when executed by a processor, cause the processor to:
      receive a data unit from a particular device;
      send an Extensible Authentication Protocol (EAP) request to the particular device;
      determine whether a first EAP packet is received from the particular device;
      authenticate, when the first EAP packet is received from the particular device, the particular device with a Remote Authentication Dial In User Service (RADIUS) server using the first EAP packet;
      determine, when the first EAP packet is not received from the particular device, whether an Hypertext Transfer Protocol (HTTP) packet was received from the particular device;
      authenticate, when the first EAP packet is not received from the particular device and when an HTTP packet is received from the particular device, the particular device using a captive-portal and using a second EAP packet;
      determine, when the HTTP packet is not received from the particular device, whether the particular device is associated with a previously unreceived type of identifier; and
      authenticate, when the particular device is associated with the previously unreceived type of identifier, the particular device using the previously unreceived type of identifier and another EAP packet; and
      authenticate, when the first EAP packet is not received from the particular device, the HTTP packet is not received from the particular device, the particular device is not associated with the previously unreceived type of identifier, and the particular device is not associated with a wireless device identifier, the particular device using a media access control (MAC) address associated with the particular device and using a third EAP packet.

19. The non-transitory computer-readable medium of claim 18, where the instructions further include:
   one or more instructions to capture an Internet Protocol (IP) address associated with the particular device;
   one or more instructions to provide the captured IP address to the RADIUS server;
   one or more instructions to receive a policy associated with the captured IP address from the RADIUS server; and
   one or more instructions to control access of the particular device to a network based on the received policy.

20. The non-transitory computer-readable medium of claim 18, where the instructions further include:
   one or more instructions to determine that the particular device is associated with the wireless device identifier, when the HTTP packet is not received from the particular device; and
   one or more instructions to authenticate the particular device using the wireless device identifier associated with the particular device and using a fourth EAP packet, based on determining that the particular device is associated with the wireless device identifier.

* * * * *